Oct. 16, 1923.
E. CLEARY
GAS AND LIQUID CONTACT DEVICE
Filed Nov. 25, 1922
1,471,101
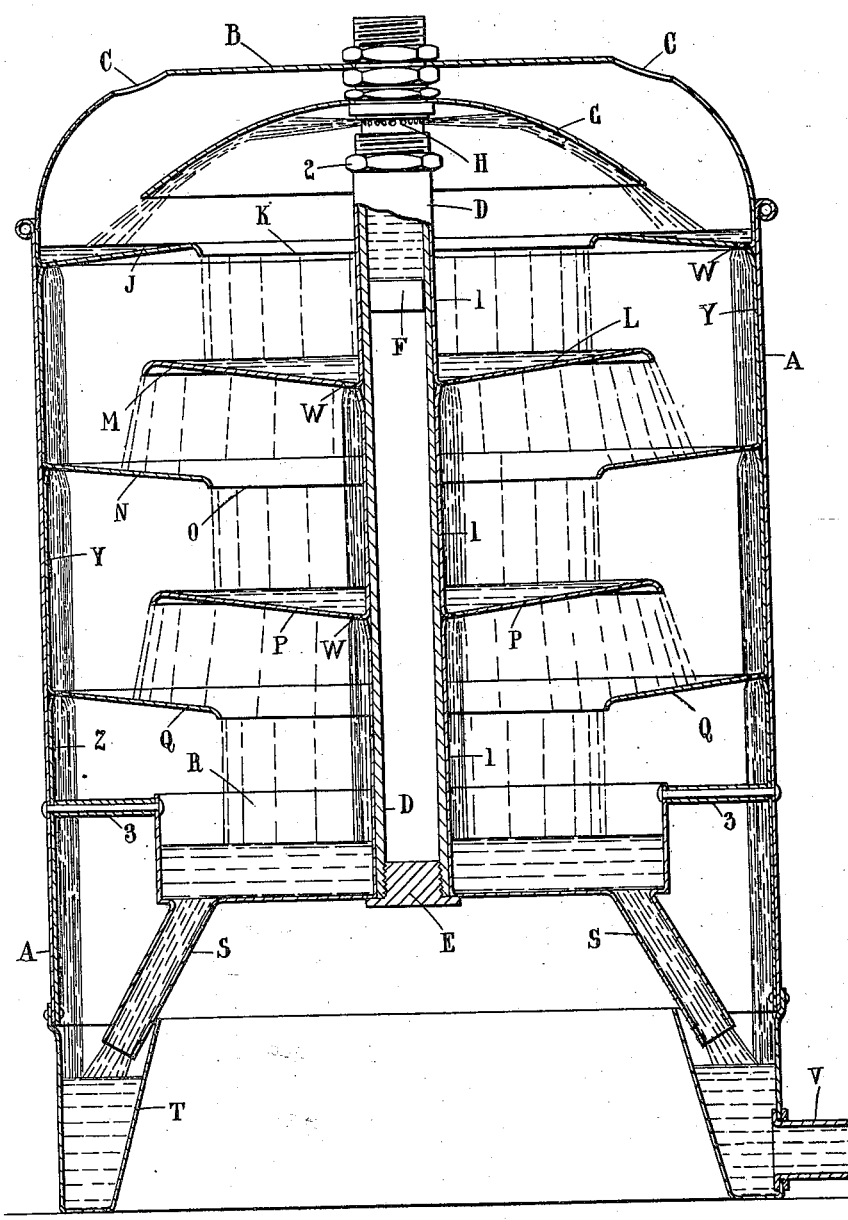
INVENTOR
Edwin Cleary, Deceased
Alfred Hutchison, Administrator
of Estate of said Edwin Cleary
By
James L. Norris
Attorney Patented Oct. 16, 1923.

1,471,101

UNITED STATES PATENT OFFICE.

EDWIN CLEARY, DECEASED, LATE OF LONDON, ENGLAND; BY ALFRED HUTCHISON, ADMINISTRATOR, OF LONDON, ENGLAND.

GAS AND LIQUID CONTACT DEVICE.

Application filed November 25, 1922. Serial No. 603,361.

*To all whom it may concern:*

Be it known that EDWIN CLEARY, deceased, late a citizen of the United States of America, residing in London, England, has invented new and useful Improvements in Gas and Liquid Contact Devices, of which the following is a specification.

This invention relates to apparatus for effecting heat interchange between water or other liquids and gases, of the kind wherein the liquid to be heated flows down a convoluted or zigzag path in contact with an ascending current of gas in a tubular vessel or shell which is provided in its interior with central upwardly-concave baffles that are mounted on a supporting rod or standard and which alternate with upwardly concave annular baffles that extend to the interior wall of the tubular shell.

According to my invention, the parts of the concave baffles next the standard and shell are perforated so as to allow a film of liquid to flow down the surfaces of said standard and shell. The perforations are small and serve also to prevent water being retained when the apparatus is not in use.

By this means the gas in addition to passing successively through annular screens of liquid falling from the free edges of the baffles and over the surfaces of liquid in and on said baffles, passes over the films of liquid covering the surfaces of the inner wall of the shell and of the standard supporting the central baffles. A very extended liquid surface is thus offered to the gases and the rate of heat interchange is consequently very rapid.

In the accompanying drawing, I have shown in vertical central section a cylindrical gas and liquid contact device constructed according to my invention:—

A is the outer casing or shell, which is open at the bottom to admit a current of gas, and is closed at the top by means of a hood B provided with holes C, C to permit the discharge of the gas. Coaxially with the casing A there is mounted a standard D, the upper end of which serves for the admission of the water or other liquid, a flanged plug E being provided at the lower end to hold the baffles in place as hereinafter described, and another plug F frictionally or otherwise secured in place near the top to confine the liquid to this end. On the upper part of the standard D there is secured a dome shaped deflector G, below which the pipe is provided with a series of holes H, H. Through these holes, the liquid issues in jets which strike the deflector G and are deflected thereby on to an annular dished baffle J, which has its convex side upwards and has a central annular lip K over which the liquid trickles in a circular screen on to the next baffle L. This is a circular dished baffle with the concave side upwards and a peripheral lip M over which the liquid trickles in a circular screen on to an annular dished baffle N having its concave side upwards and a central circular lip O from which the liquid trickles on to a circular baffle P similar to the baffle L, and from P on to a baffle Q similar to N. From Q the hot liquid passes into a circular trough R, whence is flows without splashing through conduits S, S into an annular trough T having a discharge pipe V controlled by a suitable cock or valve. The lowermost parts of the baffles J, M, P are provided with an annular series of holes W, W through which liquid trickles to form a screen or film, down the peripheral wall of the casing between the baffles J, N and down the surface of the standard D between the baffles L, P and between the baffle P and the trough R. These holes moreover allow the liquid resting on the baffles J, L, P to drain off when the water supply ceases. The baffles J, N, and Q are maintained at the required distances apart by tubular spacing pieces Y, Y formed integrally with the baffles N, Q the entire stack of baffles being supported upon a tubular spacing piece Z, below the baffle Q. Similar tubular spacing pieces 1, 1 acting in conjunction with the flanged plug E and a nut 2 on the upper part of the standard D retain the circular baffles L, P and reservoir R in position, the stack of central baffles being supported by the lowermost spacing piece. Said trough is held in its central position by radial supports 3, 3 connecting its periphery to the shell A. The baffles N, Q are preferably provided with holes W, W.

What I claim is:—

1. A gas and liquid contact device comprising an upright shell having a trough arranged peripherally inwardly at its lower end affording a central opening for the passage of gas through said shell, a reservoir within said shell secured in spaced relation to the wall thereof and positioned to confront said opening, a conduit leading from said reservoir to said trough, cooperating stacks of central and peripheral baffles within said shell, arranged in interleaved relation, said baffles being each formed with a spacing piece upon which rests the super-adjacent baffle of its stack, means carried by said reservoir and shell for supporting said stacks of baffles, means for supplying water to said baffles and a discharge pipe for said trough.

2. A gas and liquid contact device comprising an upright shell having a trough arranged peripherally inwardly at its lower end affording a central opening for the passage of gas through said shell, a reservoir within said shell secured in spaced relation to the wall thereof and positioned to confront said opening, a conduit leading from said reservoir to said trough, a standard extending upwardly from said reservoir, a stack of central baffles telescopically arranged upon said standard, a stack of peripheral baffles within said shell cooperably arranged in interleaved relation with respect to the central baffles, the baffles of both stacks being each provided with a spacing piece upon which rests the super-adjacent baffle of its stack, a hood provided with gas outlet openings, received within the upper end of said shell and seated upon the spacing piece of the peripheral baffle which it immediately overlies, said standard being provided with means for supplying water to said baffles, and a discharge pipe for said trough.

3. A gas and liquid contact device comprising an upright shell having a trough arranged peripherally inwardly at its lower end affording a central opening for the passage of gas through said shell, a reservoir within said shell secured in spaced relation to the wall thereof and positioned to confront said opening, a conduit leading from said reservoir to said trough, a standard extending upwardly from said reservoir, a stack of central baffles telescopically arranged upon said standard, a stack of peripheral baffles within said shell cooperably arranged in interleaved relation with respect to the central baffles, the baffles of both stacks being each provided with a spacing piece upon which rests the super-adjacent baffle of its stack, a hood provided with gas outlet openings and formed with a peripheral baffle, received within the upper end of said shell and seated upon the spacing piece of the peripheral baffle which it immediately overlies, a deflector within said hood and carried thereby, for deflecting water upon the peripheral baffle of said hood, said standard being provided with means for discharging water against said deflector, and a discharge pipe for said trough.

ALFRED HUTCHISON,
*Administrator of the estate of Edwin Cleary, deceased.*

Witnesses:
C. RUSSELL,
C. F. MURPHY.